United States Patent [19]

Clark

[11] Patent Number: 5,224,691

[45] Date of Patent: Jul. 6, 1993

[54] LAMP SHADE SOLDERING AID

[76] Inventor: Paul W. Clark, 106 Annapolis St., Annapolis, Md. 21401

[21] Appl. No.: 845,653

[22] Filed: Mar. 4, 1992

[51] Int. Cl.$^5$ .............................................. B23Q 1/04
[52] U.S. Cl. ..................................... 269/51; 269/76; 269/71; 269/909; 411/436
[58] Field of Search .................. 228/44.3, 47, 48, 49.1, 228/49.2; 269/50, 51, 909, 71, 76, 908; 411/386, 436, 427

[56] References Cited

U.S. PATENT DOCUMENTS

| 341,146 | 5/1886 | Howes | 411/386 |
|---|---|---|---|
| 3,773,312 | 11/1973 | Victorino | 269/50 |
| 4,145,006 | 3/1979 | Webb | 269/71 |
| 4,313,597 | 2/1982 | Hooper | 269/51 |

FOREIGN PATENT DOCUMENTS

| 382661 | 2/1908 | France | 269/76 |

OTHER PUBLICATIONS

*How to Work in Stained Glass*, Second Edition, Anita & Seymour Isenberg, 1983, pp. 213-215.
Page from catalog entitled, "Tools", Revised Oct. 1990, regarding cutters (no page number).

Primary Examiner—Richard K. Seidel
Assistant Examiner—Jeanne M. Elpel
Attorney, Agent, or Firm—Foley & Lardner

[57] ABSTRACT

A lamp shade soldering aid is used when soldering a stained glass lamp shade. The soldering aid includes a spindle, inserted through an arm, a base, a turn table, and a clamping member. A lamp shade to be soldered is inserted on the spindle and rests on the turntable, held by the clamping member. The turntable has a plurality of pivoting support members for use with the lamp shade when soldering the interior of the shade. The clamping member does not spin off of the spindle. When the lamp shade is turned, the turntable is also turned. The soldering aid provides for angular motion, such that any seam of the shade may be held in a horizontal position. The soldering aid also provides for rotating motion, such that the lamp shade may be rotated to a next seam.

10 Claims, 4 Drawing Sheets

LAMP SHADE SOLDERING AID

BACKGROUND OF THE INVENTION

1. Field of the Invention

The present invention relates to a lamp shade soldering aid which is suitable for variable positioning of a stained glass lamp shade to facilitate soldering.

Stained glass lamp shades are constructed of pieces of stained glass soldered together. A large stained glass lamp may have hundreds of pieces of stained glass, with a corresponding number of seams between the pieces of stained glass. The seams between the pieces of glass are important not only for their structural qualities, but also for their aesthetic qualities. The aesthetic properties are particularly important for the portion of the seams which can be observed when the lamp is in use.

The pieces of stained glass are frequently soldered together by the copper foil method. In the copper foil method, copper tape is wrapped around each edge of each piece of stained glass. The copper tape provides a portion which can be soldered. The pieces of stained glass may then be positioned and tacked in place by soldering a small portion of one piece to a small portion of another piece. One method of assisting the positioning of pieces uses a mold, for example of styrofoam. Tacking does not permanently secure the pieces, and therefore is only temporary. Care must be taken not to stress the tacked pieces, or the tacking will break apart. After tacking, all of the seams are rough soldered, the solder holding the pieces of stained glass together. The seams between the pieces of stained glass must further be finish soldered so that the lamp has an attractive appearance.

Finish soldering is accomplished one seam at a time. To finish solder a seam, solder is applied with a soldering iron to the copper foil at the seams. The most attractive seams are achieved by heating the solder along one seam until it is in a liquid state. The solder then solidifies into a seam having a smooth appearance.

Since the solder is in a liquid state during the finish soldering, the seam must be horizontal. If the seam is not horizontal, the solder will tend to run downward, resulting in uneven application of solder, or even resulting in the solder running off of the seam.

When finish soldering, therefore, each seam must be horizontal. The lamp shade must be angled so that each seam is horizontal. This is difficult since the lamp shade is an awkward shape. Positioning the lamp so that the inside seams can be easily reached presents another problem. Yet another problem is presented when the lamp shade includes a crown on top, having seams which must be soldered by holding the lamp shade at an awkward angle.

Since stained glass lamp shades frequently have repeating patterns, each seam usually has corresponding seams requiring the same angling of the lamp shade. Thus, the lamp shade can advantageously be rotated about its axis to the corresponding seam in the next repeat.

While positioning the lamp shade, care must be taken to not disturb or break the tacked or rough soldered pieces. Furthermore, a craftsman performing the soldering holds the solder in one hand and the soldering gun in the other, and thus has no free hands to hold the lamp shade.

2. Discussion of the Related Art

Therefore, various devices for holding a stained glass lamp shade during soldering have been developed. The most primitive but most popular device is a large box filled with crumpled newspaper.

One other type of conventional device for holding a stained glass lamp shade relies largely on a vase cap which is soldered to the apex of the lamp shade. The vase cap has a hole in the top, through which a shank can be inserted. The lamp can then be rotated about the shank. This has the unfortunate effect of placing all of the stress on the vase cap area and can result in deformation of the lamp shade. Therefore, this can only be used with smaller lamp shades.

Another type of conventional device for holding a stained glass lamp shade uses a stationary base beneath the lamp shade and threads a shank through the vase cap. A nut placed on top of the vase cap is used to clamp the lamp shade to the base. However, the method of clamping tends to over-tighten, thus distorting or even breaking the lamp shade. Furthermore, this device does not provide for soldering the inside seams, and thus only solves a portion of the problem. Also, because the shade must be rotated on top of the stationary base, the copper tape on the pieces of glass on the bottom of the shade tends to tear.

Yet another type of conventional device for holding a stained glass lamp shade provides a method for soldering the inside seams by providing fixed side supports on which the lamp shade can rest. Further support may be provided by inserting a shank through the vase cap. This device has the drawback that the support provided is not sturdy and does not conform to the variable shape of the lamp shade. It also has the further drawback of requiring manually lifting and rotating the lamp on the device to reach other seams.

Other devices have been known which provide the rotational variability. As mentioned above, conventional devices provide that the lamp shade can be rotated about a shank through the vase cap. However, the lamp shade is rotated to one position and then fixed by clamping down on the vase cap. Each act of clamping presents the danger of over tightening and thus deforming or breaking the lamp shade. The device used to clamp is spun up the shank, presenting an additional risk of breaking the lamp if it flies off the shank.

Other drawbacks of conventional devices are that they do not provide for incremental positioning of the shade. Numerous other complex mechanisms have been tried to overcome all of these problems with a resulting increase in complexity. There remains a need for a simple stained glass lamp shade soldering aid which can successfully adapt to the shape of various lamp shades, is easily used even with large lamp shades, and does not tend to break or distort the lamp shade.

SUMMARY OF THE INVENTION

It is therefore an object of the present invention to provide an apparatus for holding and positioning a stained glass lamp shade to facilitate soldering.

It is another object of the present invention to provide a device for holding and positioning a stained glass lamp shade to facilitate easy and accurate finish soldering.

It is yet another object of the present invention to provide a sturdy device for holding and positioning stained glass lamp shades of various sizes, including large lamp shades.

It is a further object of the present invention to provide a device for holding and positioning a lamp shade with less tendency to over-tighten, break or deform the lamp shade.

It is another object of the present invention to provide a device for holding and positioning a lamp shade which is easily used.

The lamp shade soldering aid of the invention includes a top clamping member, a base and an arm connected pivotally to the base. A turntable, on which the lamp shade may be placed, is rotationally connected to the arm. A spindle is rotationally inserted through the top clamping member, the turntable and the arm.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An exemplary embodiment of the invention is illustrated in the drawings and described in detail below.

In the drawings.

DETAILED DESCRIPTION OF THE PREFERRED EMBODIMENTS

Figure 1:
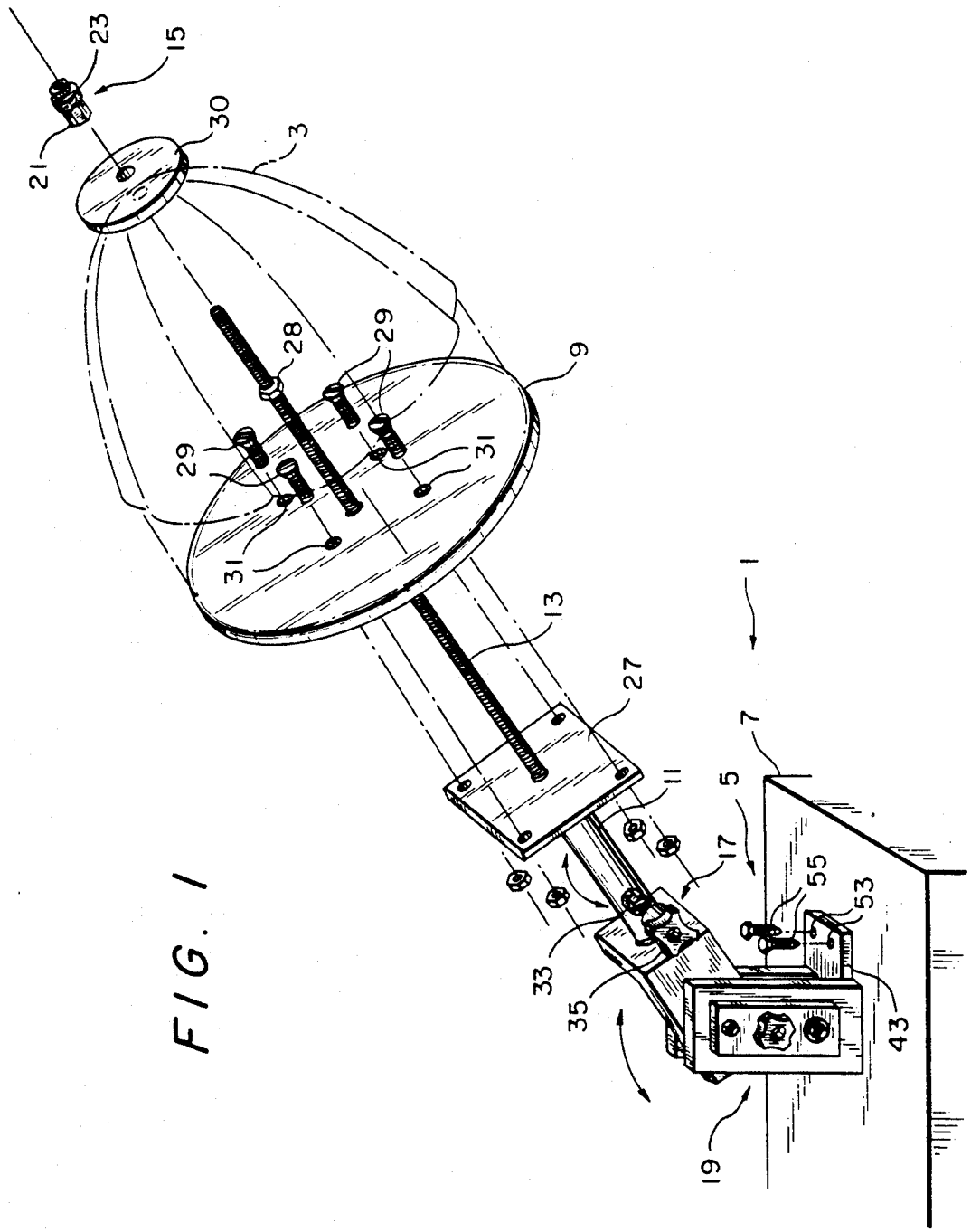
FIG. 1 is an exploded perspective view of one embodiment of the invention, used with a lamp shade.

FIG. 1 shows the general structure of a stained glass lamp shade soldering aid 1 in use with a stained glass lamp shade 3. The soldering aid 1 is pivotally connected to a base 5 which may be affixed to a bench 7.

The soldering aid 1 comprises a turntable 9, an arm 11, a spindle 13, a top clamping member 15, and a rotation clamping member 17. The turntable 9 is rotationally connected to the arm 11. The spindle 13 is inserted through the arm 11 and the turntable 9. The spindle 13 may be inserted through a lamp shade 3 with a vase cap. The spindle 13 is inserted through the top clamping member 15. The rotation clamping member 17 is connected to the arm 11 and is used to fix the turntable 9, and thus the lamp shade 3, at variable rotations.

The soldering aid 1 may be pivotally connected to the base 5. An angle clamping member 19 is attached to the base and is used to fix the soldering aid 1, and thus the lamp shade 3, at variable angles.

The base 5 provides for sturdy support of the soldering aid 1. The support provided by the base 5 must counter-balance the lamp shade 3 at any angular position of the soldering aid 1. Thus, as illustrated, the base 5 may be affixed to the bench 7.

Figure 5:
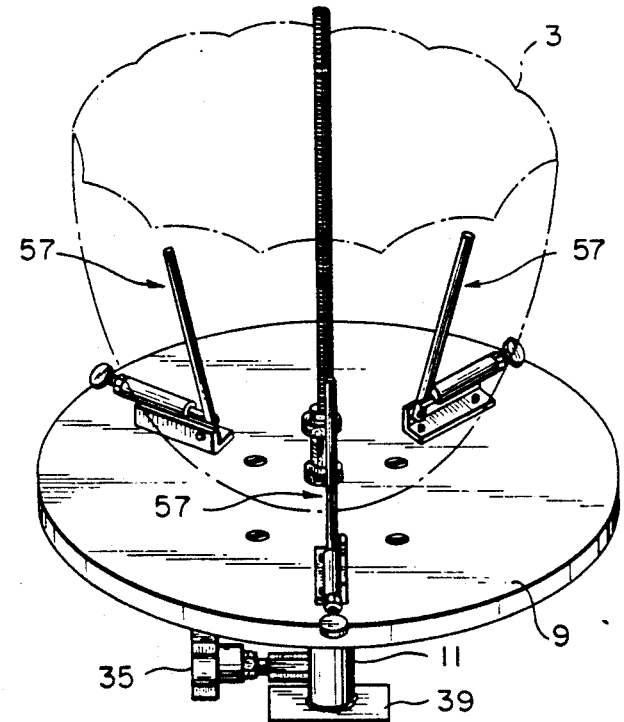
FIG. 5 is a perspective view of the invention illustrating use for soldering inside seams.

The top clamping member 15 may be used with a lamp shade 3 positioned for soldering outside seams, as illustrated in FIG. 1, and for a lamp shade 3 positioned for soldering inside seams, as illustrated in FIG. 5. The top clamping member 15 must provide that the lamp shade 3 is secured to the turntable 9 without over-tightening. Thus, the spindle 13 may be a threaded rod and the top clamping member 15 may comprise a first nut 21. The threading on the rod should allow the first nut 21 to be spun in easily. To provide a larger surface for manual control, a disc 23 is preferably affixed to the first nut 21. The disc 23 should have a knurled outer edge. Also, the top clamping member 15 should spin without falling off when at a top end of the spindle 13, such that when the top clamping member 15 is spun up, it will not spin off and fall onto the lamp shade 3. Thus, the clamping member should have a threaded interior top half 21a and a smooth interior bottom half 21b. If the top clamping member 15 is to be used with a lamp without a vase cap or a spider, a small flat plate 30 may be placed between the top clamping member 15 and the lamp shade 3.

Figure 2:
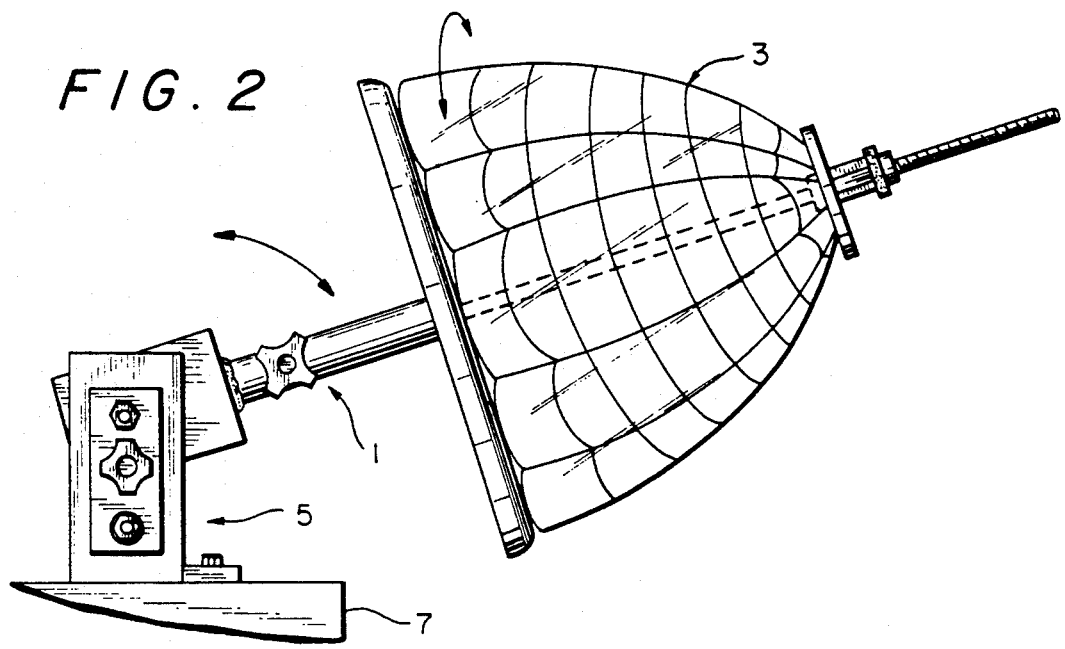
FIG. 2 is an elevational view of one embodiment of the invention, with a lamp shade, illustrating the rotational and angular motion.

As illustrated in FIG. 2, the lamp shade 3 inserted on the soldering aid 1 according to the present invention can be positioned such that a seam in the lamp shade 3 is horizontal and can be properly soldered. Furthermore, the lamp shade 3 inserted on the soldering aid according to the present invention can be incrementally rotated about its axis, so that other seams in the lamp shade 3 can be soldered.

Figure 4:
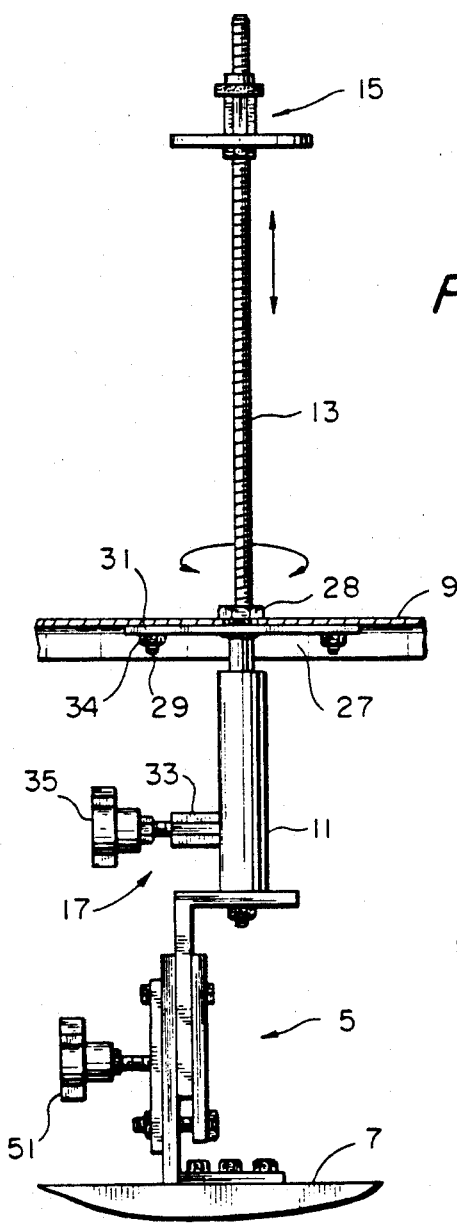
FIG. 4 is an elevational view of the invention.

Referring now to FIG. 4, the turntable 9 should be affixed to the spindle 13. One way is to connect the turntable 9 to a plate 27 which is inserted on the spindle 13 below the turntable 9 and above the arm 11. A plurality of bolts 29, preferably four, may be inserted through a plurality of holes 31 in the turntable 9 corresponding to a plurality of holes 34 in the plate 27. A nut 28 on the spindle 13 may further fix the turntable 9 to the spindle 13.

The lamp shade 3 is placed on the turntable 9 to provide a rotational motion to the lamp shade 3. The turntable 9 is therefore rotationally connected to the arm 11. In a preferred embodiment, the arm 11 includes a first hollow sleeve and the turntable 9 is connected to the flat plate 27 which in turn is affixed to a second sleeve 32. To provide the rotational motion, the second sleeve 32 on the plate 27 is rotationally inserted into the first sleeve of the arm 11.

Once the desired rotation of the lamp shade 3 is achieved, the rotation clamping member 17 allows the turntable 9 to be rotated to a desired position, and then prevents further rotation of the turntable 9. The rotation clamping member 17 prevents rotation by stopping rotation of the inner sleeve inserted into the arm 11. Thus, the arm 11 may have an aperture 33 through which the rotation clamping member 17 may exert pressure on the second sleeve. The rotation clamping member may be a bolt inserted through the aperture 3, which may be tightened or loosed. A knob 35 may be connected to the bolt to provide for easier manual tightening or loosening.

Figure 3:
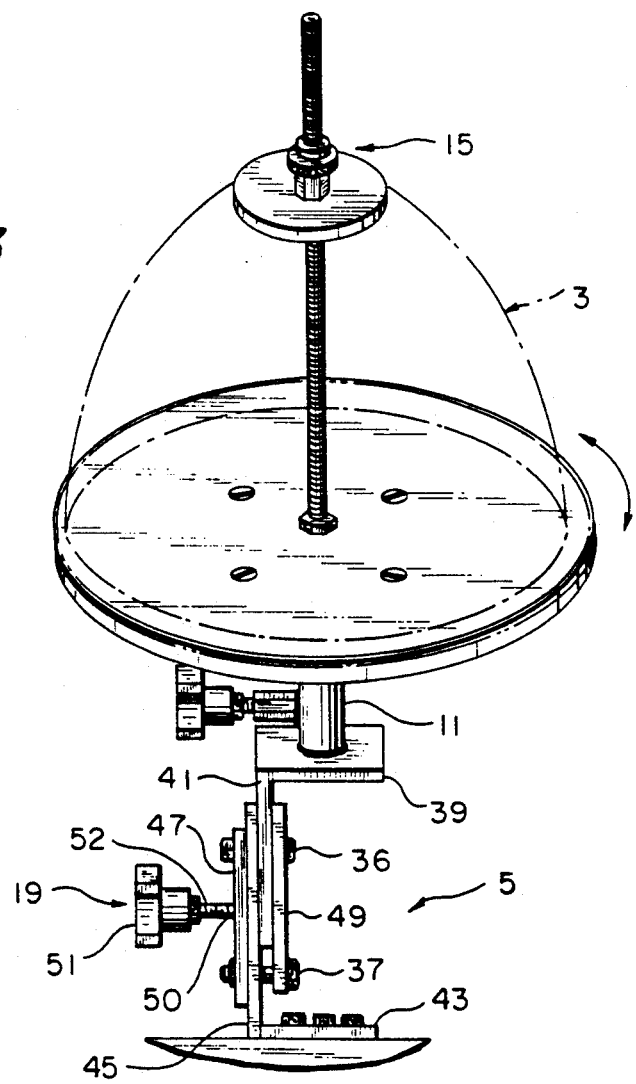
FIG. 3 is a perspective view of one embodiment of the invention.

Referring to FIG. 3, the arm 11 is pivotally connected to the base 5, to provide angular motion to the arm 11 and thus to position the lamp shade 3 at an angle. The angular motion may be provided by fixing the arm 11 to a horizontal rectangular arm plate 39, which is in turn fixed at a right angle to a vertical rectangular arm plate 41. The base 5 may comprise a horizontal rectangular base plate 43, fixed at a right angle to a first vertical rectangular base plate 45. A second and third vertical base plates 47, 49 should be provided on each side of the first vertical base plate 45. The vertical arm plate 41 should be placed between and pivotally connected to the first and second vertical base plates 45, 47. A pivotal connection can be accomplished by a first bolt 36 placed through corresponding holes in the vertical plates 41, 45, 47 and 49. To provide stability, the first, second and third vertical plates 45, 47 and 49 are preferably connected by a second bolt 37.

The angle clamping member 19 allows the arm 11 to be angled at a desired position, and then prevents further angular motion of the arm 11 even when used with a large lamp shade 3. The angle clamping member 19 prevents further angular motion by stopping a pivoting of the arm 11 with the base 5. Thus, the base 5 may have an aperture 50 through which the angle clamping member 19 may exert pressure on the arm 11. The angle clamping member 19 should distribute pressure which it exerts over a large portion of the arm, to prevent angular motion with large lamps. The angle clamping member 19 may be a bolt 52 inserted through a hole in the second vertical base plate 47, which may be tightened or loosed. When tightened, the bolt 52 exerts pressure on the first vertical member 45 which in turn exerts pressure on the vertical arm plate 41. A knob 51 may be connected to the bolt to provide for easier manual tightening or loosening. The base 5 should be positioned so that the knob 51 is on the right or left side of the base for right- or left-handed use, respectively. FIGS. 1-5 illustrate the base positioned for left-handed use.

Referring again to FIG. 1, the base 5 steadies the soldering aid 1 and the lamp shade 3. Therefore, the base 5 may be connected to the bench 7. A plurality of holes 53 for bolts 55 may be provided in the horizontal base plate 43 such that the horizontal base plate 43 may be attached to the bench 7. To allow the soldering aid to tilt to at least 120° such that a crown on the lamp may be soldered, the base 5 should be positioned near the edge of the bench 7.

The arm knob 35 can be manipulated while the turntable 9 is temporarily manually held in position. Similarly, the base knob 51 can be manipulated while the arm 11 is temporarily manually held in position.

Referring now to FIG. 4, the top clamping member 15 provides pressure on the lamp shade 3 (not shown) such that the lamp shade 3, the spindle 13 and the turntable 9 rotate together. This provides a sturdy positioning of the lamp shade 3. Furthermore, since both the shade 3 and the turntable rotate, there is no risk of damaging the lower edge of the lamp 3.

Turning now to FIG. 5, the turntable 9 provides a sturdy platform for working on the lamp shade 3. The turntable 9 can be used for soldering both inside and outside seams. The turntable 9 has a shape which supports the lamp shade 3 placed thereon. Thus, the turntable 9 is flat, and is preferably a round disc having a diameter at least as larger as the diameter of the lamp shade 3. It may be advantageously made out of a sturdy, non-warping material, such as flake board. FIGS. 1-3 have illustrated the soldering aid 1 used for soldering outside seams.

FIG. 5 illustrates the soldering aid 1 used for soldering inside seams. The soldering aid 1 can be used to solder the inside of plurality of lamp shades having a variety of shapes. A plurality of support members 57 allow the turntable 9 to be used with various lamp shades. The support members 57 are removed when the soldering aid is used for soldering exterior seams. The plurality of support members 57 are pivotally affixed to the turntable 9, at a distance from the center of the turntable 9. There are preferably three support members.

Figure 6:
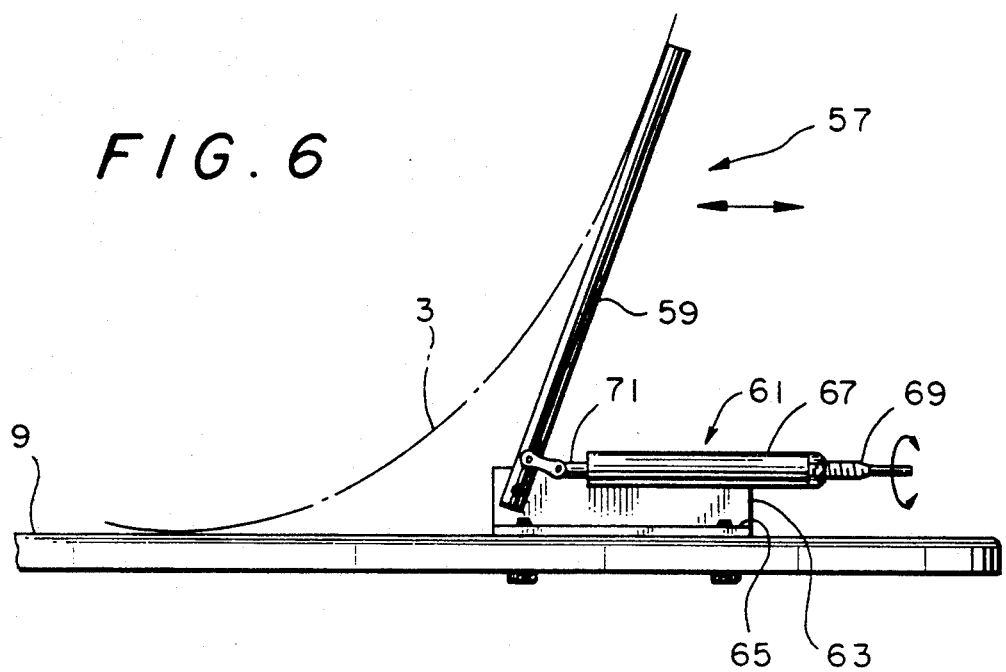
FIG. 6 is an elevational view of a support member on a turntable.
Figure 7:
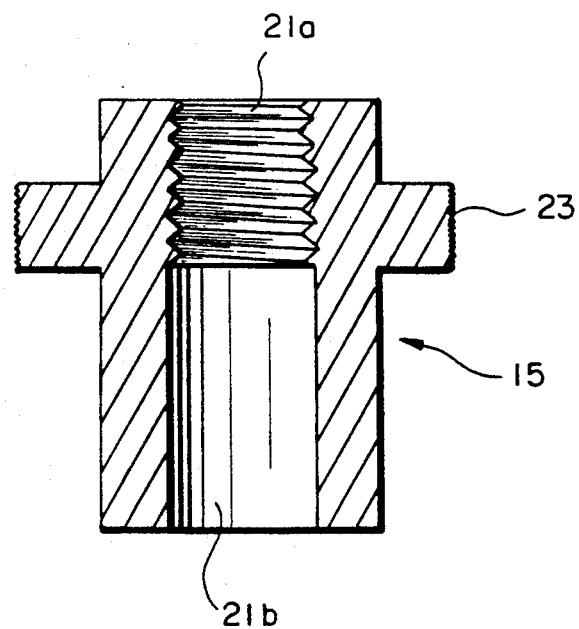
FIG. 7 is a cross-sectional view of a top clamping member.

Referring now to FIG. 6, the support member 57 comprises a rod 59 pivotally connected to the turntable 9, such that the rod 59 may be adjusted to have a same angle as a portion of the lamp shade 3.

The support member 57 further comprises a positioning member 61 connected to the turntable 9 and pivotally connected to a support rod 59. The positioning member 61 limits the downward motion of the support rod 59. The positioning member 61 may be a first and second rectangular flat plate 63, 65, connected at a right angle, the first flat plate 63 connected to an interiorly threaded sleeve 67 into which a threaded thumb screw 69 is inserted at one end and an unthreaded rod 71 is inserted at the other end. The rod 71 is pivotally attached to the support rod 59. The second flat plate 65 is connected to the turntable 9. When the thumb screw 69 is rotated a first way, the thumb screw 69 presses on the unthreaded rod 71, causing the support rod 59 to pivot upward. When the thumb screw 69 is rotated a second way, the thumb screw 69 relieves pressure on the unthreaded rod 71, allowing the support rod 59 to pivot downward.

Other embodiments are possible. For example, the soldering aid may also be used to hold molds on which glass pieces are placed for soldering. Also, other methods may provide a sturdy support for the base. For example, the base could be mounted on a board which is clamped to a base. As another example, the spindle may be removed and replaced with a larger or smaller spindle, for use with larger or smaller lamps. Alternatively, the spindle may be removed, if desired.

While specific embodiments of the invention have been described and illustrated, it will be clear that variations in the details of the embodiments specifically illustrated and described may be made without departing from the true spirit and scope of the invention as defined in the appended claims.

What is claimed is:

1. A soldering aid for holding and positioning a lamp shade, comprising:
   (a) a top clamping member;
   (b) a base;
   (c) an arm connected pivotally to the base;
   (d) a turntable, rotationally connected to the arm, on which the lamp shade may be placed;
   (e) a spindle rotationally inserted through the top clamping member, and said spindle maintained in position by the turntable and the arm; and
   (f) a plurality of support members pivotally connected to the turntable, to pivot at a variable angle with respect to the turntable, for use in soldering an inside surface of the lamp shade at various angles without repositioning the shade on the turntable.

2. The soldering aid of claim 1, wherein the base further comprises an angle clamping member, for fixing the soldering aid at a variable angle.

3. The soldering aid of claim 1, wherein the base is adapted to be attached to a bench.

4. The soldering aid of claim 1, further comprising a horizontal plate affixed to an inner sleeve, wherein the arm includes a first sleeve, the inner sleeve being rotationally inserted in the first sleeve and rotatable maintained by the spindle below the turntable, wherein the turntable is rotatably connected to the arm.

5. The soldering aid of claim 4, wherein the arm further comprises a rotation clamping member, for stopping rotation of the inner sleeve.

6. The soldering aid of claim 1, wherein the arm further comprises a substantially horizontal arm plate fixed at a right angle to a substantially vertical arm plate.

7. A soldering aid for holding and positioning a lamp shade, comprising:
 (a) a top clamping member including (1) an interior threaded section, (2) an interior unthreaded section, and (3) an exterior with a disc;
 (b) a base including (1) a horizontal base plate fixed at a right angle to a first vertical base plate, and (2) a second and third vertical base plates positioned on each side of the first vertical base plate;
 (c) an arm, pivotally connected to the base, including (1) a horizontal arm plate fixed at a right angle to a vertical arm plate inserted between and pivotally connected to the first and second vertical base plates, (2) a first hollow sleeve connected to the horizontal arm plate;
 (d) a turntable, rotatably connected to the arm, on which the lamp shade may be placed;
 (e) a horizontal plate affixed to a second hollow sleeve and to the turntable, the second sleeve being inserted into the first sleeve;
 (f) a plurality of support members, removably and pivotally connected to the turntable, including (1) a first plate connected at a right angle to a second plate, (2) an interiorly threaded sleeve connected to the first plate, (3) a threaded thumb screw inserted into the threaded sleeve, (4) a first rod pivotally connected to the turntable, (5) an unthreaded rod pivotally connected to the first rod inserted in the sleeve and pressed on by the thumb screw, the second flat plate being connected to the turntable;
 (g) a threaded spindle rotatably inserted through the top clamping member, and said spindle maintained in position by the turntable, the horizontal plate, and the second sleeve;
 (h) an angle clamping member inserted through the second vertical plate and cooperating with the vertical arm plate and the first vertical base plate, wherein the arm may be fixed at a plurality of angles; and
 (i) a rotation clamping member, inserted through the first sleeve and cooperating with the second sleeve, wherein the turntable may be fixed at a plurality of positions.

8. A soldering aid for holding and positioning a lamp shade, comprising:
 (a) a top clamping member including (1) an interior threaded section, (2) an interior unthreaded section and (3) a disc permanently mounted on the top clamping member, whereby the top clamping member is rotated;
 (b) a base;
 (c) an arm connected pivotally to the base;
 (d) a turntable, rotationally connected to the arm, on which the lamp shade may be placed; and
 (e) a threaded spindle rotationally inserted through the top clamping member, and said spindle maintained in position by the turntable and the arm.

9. A soldering aid for holding and positioning a lamp shade, comprising:
 (a) a top clamping member;
 (b) a base;
 (c) an arm connected pivotally to the base;
 (d) a turntable, rotationally connected to the arm, on which the lamp shade may be placed;
 (e) a spindle rotationally inserted through the top clamping member, and said spindle maintained in position by the turntable and the arm; and
 (f) the base including a substantially horizontal base plate fixed at a right angle to a first substantially vertical base plate, second and third substantially vertical base plates provided on each side of the first vertical base plate, the arm being positioned between and pivotally connected to the first and second vertical base plates.

10. A soldering aid for holding and positioning a lamp shade, comprising:
 (a) a top clamping member;
 (b) a base;
 (c) an arm connected pivotally to the base;
 (d) a turntable, rotationally inserted through the top clamping member, and said spindle maintained in position by the turntable and the arm;
 (f) a plurality of support members pivotally connected to the turntable; and
 (g) the support members each including a support rod, a positioning member connected to the turntable and pivotally connected to the support rod for limiting a downward motion of the support rod, the positioning member including first and second generally flat plates being connected at a right angle, the first flat plate being connected to an interiorly threaded sleeve having a first end into which a threaded thumb screw is inserted and a second end into which an unthreaded rod is inserted, the unthreaded rod being pivotally attached to the support rod, and the second flat plate being connected to the turntable.

* * * * *